Aug. 9, 1949.   R. L. FREAS   2,478,866
AIRCRAFT DRIFT ANGLE INDICATOR
Filed Dec. 6, 1944   3 Sheets-Sheet 1
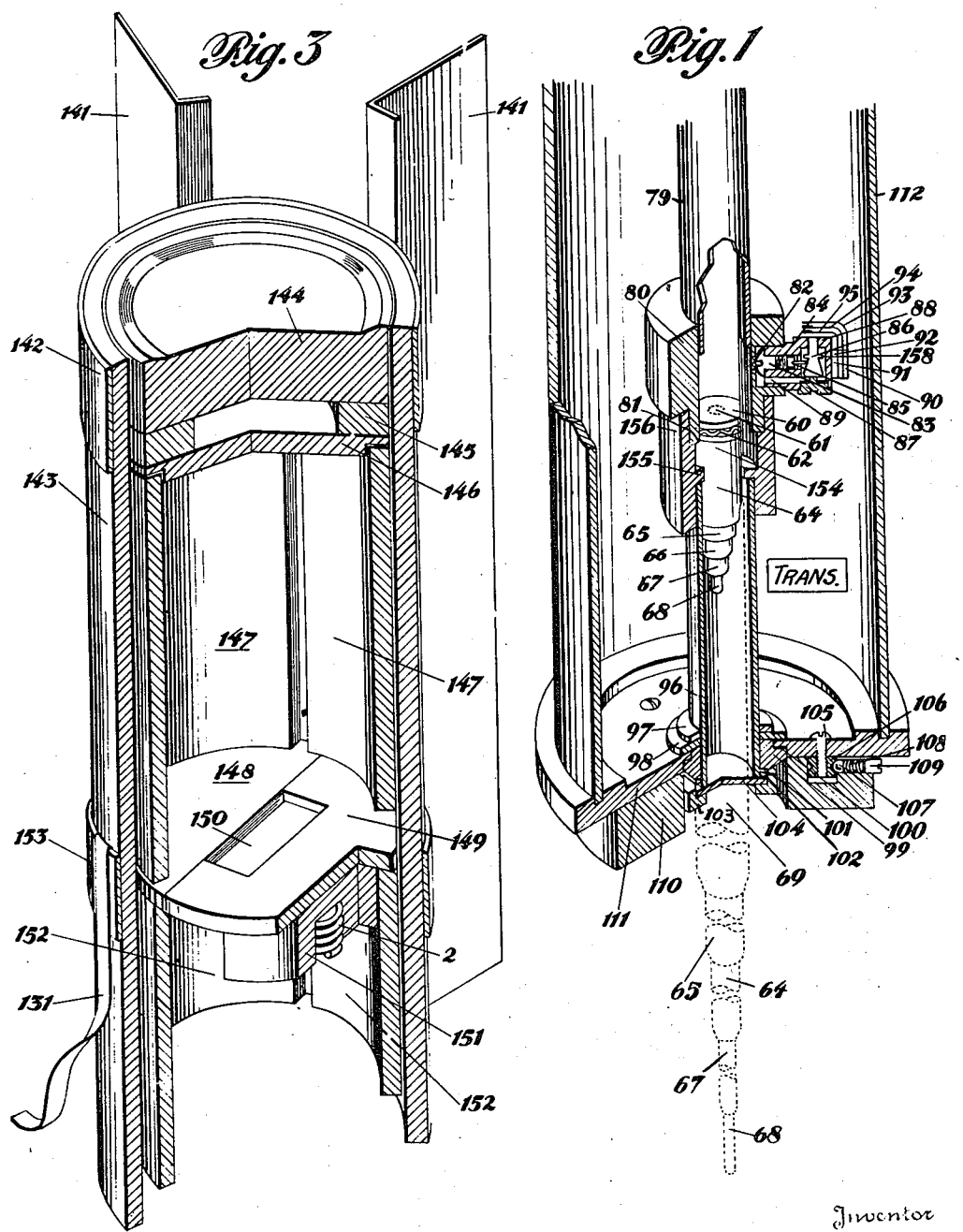

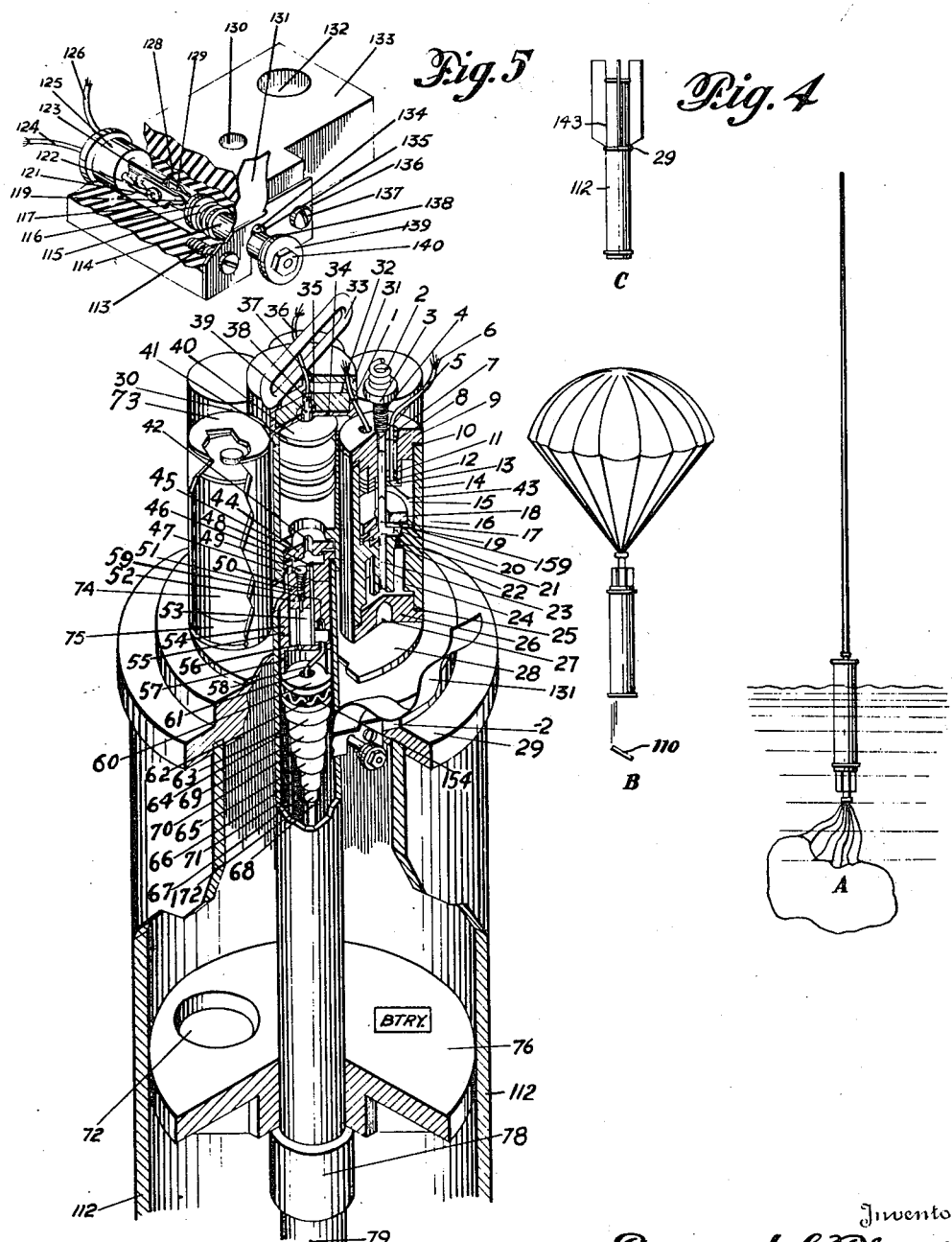

Aug. 9, 1949.        R. L. FREAS        2,478,866
AIRCRAFT DRIFT ANGLE INDICATOR
Filed Dec. 6, 1944        3 Sheets-Sheet 3

Inventor
Raymond L. Freas

By

Attorney

Patented Aug. 9, 1949

2,478,866

UNITED STATES PATENT OFFICE 2,478,866

AIRCRAFT DRIFT ANGLE INDICATOR

Raymond L. Freas, Conshohocken, Pa.

Application December 6, 1944, Serial No. 566,931

15 Claims. (Cl. 250—1)

(Granted under the act of March 3, 1883, as amended April 30, 1928; 370 O. G. 757)

This invention relates to an improved radio transmitting apparatus for quickly and accurately determining the drift factor in aerial navigation and more particularly to an improved apparatus which may be dropped or launched from an aircraft or other mobile object in any manner to a water surface or a land surface, and which automatically radiates radio frequency signals while resting on the aforementioned water surface or land surface.

The invention further relates to improved means for controlling the descent of said apparatus through the atmosphere after being dropped or launched from an aircraft, and to means for automatically initiating the proper operation of said apparatus when dropped or launched from the aircraft or other mobile object to a water surface or land surface.

An object of the invention when used in conjunction with any radio receiver or radio direction finder is to provide a means for determining the drift and actual direction of motion of an aircraft or other mobile object relative to the adjacent surface.

A further object of the invention when used in conjunction with any radio receiver or radio direction finder is to provide a means for the marking of any object or position on a water surface or land surface so that a homing course to the object or position may be set.

Another object is to provide an improvement wherein a safety electric switch forms a part of the invention, said safety electric switch being securely held in an open position to prevent accidental discharge of a charge of explosive powder prior to launching the apparatus and remaining in an operative state for the purpose of closing an electric powder charge firing circuit and which will not be adversely affected by surrounding atmospheric or liquid pressures.

Another object is to provide an improvement wherein a time delay position operated electric switch contains a time delay feature and closes an electric powder charge firing circuit upon the expiration of the time delay and completion of certain other operations, both in atmosphére and water.

Another object is to provide an improvement wherein a multi-section collapsible tubular te'escopic antenna is centrally and securely contained within the apparatus before the apparatus assumes an operable state, and which is extended or erected in a secure manner after the apparatus assumes an operable state by the generation of gas pressure caused by a timed explosive powder charge.

Another object is to provide an antenna lock and release cylinder for locking and automatically releasing the lock of an antenna contained within an object to be launched or dropped from an aircraft or other mobile object to a surface of the earth.

Another object is to provide a pressure operated electric switch actuated by the antenna erecting gas pressure for the purpose of closing radio transmitting circuits.

Another object is the provision of a device which will be economical to manufacture, reliable in operation and which possesses all the qualities of ruggedness and dependability in service.

A brief description of the figures of the drawing are as follows:

Fig. 1 is an elevation partly in section of the upper portion of the drift indicator of this invention.

Fig. 2 is an elevational view partly in section of the lower portion of the drift indicator of this invention.

Fig. 3 is an elevation partly in section of the parachute container.

Fig. 4 represents three views of the stages of operation of the apparatus of this invention.

Fig. 5 is an isometric view partly in section of the safety switch.

Figure 8:
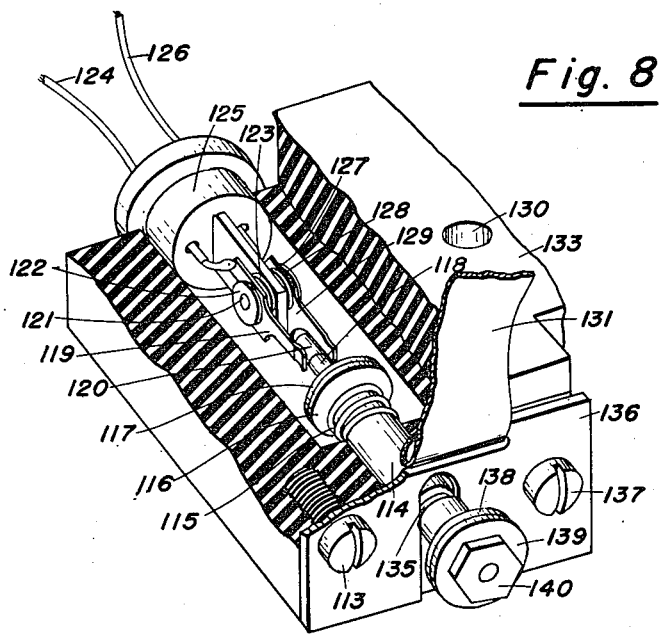
Fig. 8 is a magnified showing of Fig. 5.
Figure 6:
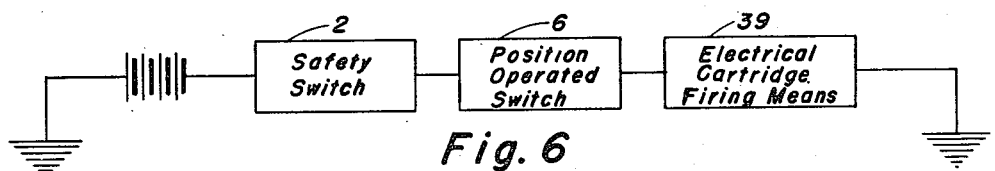
Fig. 6 is a wiring diagram of the fire control circuit.
Figure 7:
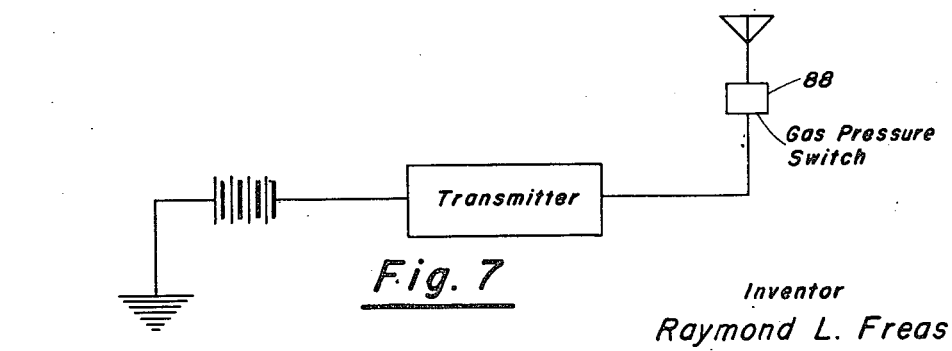
Fig. 7 is a wiring diagram of the transmitter circuit.

One form of the invention is illustrated in the above figures. This form of the invention is primarily a compact radio transmitter which, together with its internally contained telescoping powder operated antenna, safety electric switch, and time delay position operated switch, is designed so that it can be dropped from an aircraft to a water surface and remain in an operative state for the purpose of radiating radio frequency signals while resting on the water surface.

A detailed description of the radio transmitter will not be given since any one of a variety of simple transmitter circuits may be used successfully with the apparatus of the present invention.

The operation of the invention is briefly described as follows: The apparatus is dropped from an aircraft, and after falling freely for a predetermined time or to a predetermined altitude, a timing device or an altimeter controls the automatic release of an electric safety switch, a mercury switch, and a parachute which is securely attached to one end of the device.

The parachute thus serves a dual purpose; first, to automatically release the counterweight from the apparatus by inertia reaction and, second, to lower the apparatus to the water or land surface. The purpose of the counterweight is to fix the center of gravity of the apparatus in such a manner that desirable orientation in free flight is accomplished. The center of gravity and center of buoyancy of the apparatus are such that, upon alighting on the water surface, the apparatus assumes an inverted position with respect to that which it had while falling through the atmosphere.

A mercury switch utilizing a time delay feature closes the firing circuit after the apparatus has assumed operating position in the water. The firing circuit ignites a powder charge for the purpose of generating a gas pressure for erecting a telescopic antenna and closing a pressure-operated electric switch which starts operation of the radio and causes radio frequency signals to be radiated.

The pictorial sketches in Fig. 4 illustrate in (C), the apparatus just after release from the aircraft, (B), just after release of the parachute, and (A), its operating position in the water.

The following paragraphs give a more detailed description of the apparatus.

Referring to Fig. 4, the apparatus C, is composed of an assembly of the devices of Fig. 1, Fig. 2, Fig. 3, Fig. 5 and a parachute. The device of Fig. 3 is securely attached in a detachable manner to Fig. 2 by means of the inside diameter of casing 143 engaging the smaller diameter of bulkhead 29.

Prior to launching the apparatus from the aircraft, the timing device or altimeter 144 is adjusted to a predetermined time or altitude which is dependent upon the altitude of the aircraft. At the instant of lauching the timing device or altimeter 144 is manually set in an operative state so that it counts time or altitude while the apparatus is freely falling as shown in C of Fig. 4. During the time the apparatus is freely falling as shown in C of Fig. 4, the parachute shown in B of Fig. 4, is securely retained within the compartment bounded by bulkheads of 149, 148, 146 and longitudinally split inner casing 147. Longitudinally split inner casing 152 is supported in position by the smaller diameter of bulkhead 29 and is retained in a fixed angular position relative to bulkhead 29 for the purpose of locating bulkhead 149, spring retainer 151, and spring 2 relative to cap 3. Spring retainer 151 is securely attached to bulkhead 149. The rectangular opening in bulkhead 149 permits passage of the parachute shroud lines from ring 33, where they are securely attached, to within the compartment bounded by bulkheads 149, 148, 146 and longitudinally split inner casing 147. The timing device or altimeter 144 is securely attached to outer casing 143 and forms a retainer by which gas check collar 145, bulkhead 146, longitudinally split inner casing 147, bulkheads 148 and 149, spring retainer 152, and spring 2, are all confined in their respective positions within outer casing 143 and relative to bulkhead 29. Fins 141 are securely attached to fin supports 142 and 153 which are securely attached to outer casing 143 and provide a means of directing the flight when the invention is freely falling as shown in C of Fig. 4. Safety switch lanyard 131 is securely attached to fin support 153. Spring 2 overpowers spring 4 when Fig. 3 is assembled to Fig. 2 so that mercury is not permitted to enter cavity 15 of the time delay position operated switch of which a more complete explanation will later be made.

During the time the apparatus is freely falling in a state as shown in C of Fig. 4, the timing device or altimeter 144 counts time or altitude, and at the expiration of the preset time or altitude causes the ignition of a charge of explosive powder contained within the space bounded by timer 144, gas check collar 145, and bulkhead 146 for the purpose of forcibly separating and freeing Fig. 3 from Fig. 2. A detailed description of the manner in which Fig. 3 is separated from Fig. 2 is: the gas pressure generated by ignition of the powder charge expands in the volume bounded by timer 144, gas check collar 145 and bulkhead 146 thus separating timer 144, outer casing 143, fins 141, fin bands 142 and 153, and lanyard 131, all of which are securely attached together, from bulkhead 29 of Fig. 2 by means of a telescopic action of a casing 143 about longitudinally split inner casing 152, bulkheads 149 and 148, longitudinally split inner casing 147 and bulkhead 146; in addition to other purposes herein noted, bulkhead 146 provides a means upon which the back pressure of the exploded powder charge reacts since it is supported by longitudinally split inner casing 147, bulkheads 149 and 148, and longitudinally split inner casing 152 all of which are supported by bulkhead 29 and confined in a slidable manner within outer casing 143; further, gas check collar 145, bulkhead 146 and longitudinally split inner casing 147, and bulkheads 148 and 149 provide a means of protecting the parachute from flames or hot gases resulting from the powder explosion and also provide a means of protecting the parachute mechanically at all times during free flight of the apparatus and more especially provide a means of protecting the parachute from becoming damaged during the ejection of outer casing 143.

In the interval of operation of the invention between that shown by C and B of Fig. 4, the outer casing 143 with all parts previously identified herein as being attached securely thereto including keeper 136 of safety switch -2, gas check collar 145, bulkhead 146, longitudinally split inner casing 147, bulkheads 149 and 148, spring retainer 151, spring 2, and longitudinally split inner casing 152 are freed from the apparatus and provide a means of freeing the parachute for deceleration of the apparatus before it strikes the water surface.

The function of counterweight 110 is to position the center of gravity of the apparatus properly for free falling attitude as shown in C of Fig. 4. When the parachute is inflated as shown in B, Fig. 4, the counterweight 110 is caused to separate from bulkhead 111 by inertia reaction. Counterweight 110 is secured to bulkhead 111 by an adjustable means so that the magnitude of force required to remove it from bulkhead 111 may be varied. Stud 106 is securely attached to bulkhead 111 by screw 105. Ball 107 is retained against the circular V notch of stud 106 by means of spring 108 exerting a pressure proportional to the adjustment of screw 109. Ball 107, spring 108 and screw 109 are retained within a cavity within counterweight 110. When the actual weight of counterweight 110 is increased to a larger apparent weight due to deceleration in the roper direction, ball 107 is forced against spring 108 by the inclined plane of stud 106 due to counterweight 110 separating from bulkhead 111. Then the apparent weight of counterweight 111 becomes sufficient to cause ball 107 to overcome pressure of spring 108, ball 107 moves a distance sufficient to clear the large diameter of stud 106 and counterweight 111 carrying with it screw 109, spring 108 and ball 107 separates and becomes free of bulkhead 111. Several assemblies of screw 105, stud 106, ball 107, spring 108 and screw 109 are required and are spaced equidistantly in a circular manner.

The ejection of Fig. 3 from Fig. 2 causes safety switch -2, which is electrically connected in series with a time delay position operated switch (to be later herein described in detail), to close and connect a battery source of E. M. F. to the time delay position operated switch.

Referring to Fig. 2, safety switch -2 shown in detail in Fig. 5 is securely attached between ring 28 and bulkhead 29. Ring 28 is securely attached to bulkhead 29. Lanyard 131 is securely attached between fin band 153 and keeper 136. Safety screws 113 and 137 securely attach, and keep in engagement, keeper 136 to switch body 133 and provide a means of preventing safety switch -2 from closing the circuit in which it is connected from any accidental cause previous to launching the apparatus. Safety screws 113 and 137 are manually removed from switch body 133 immediately prior to launching the invention. When Fig. 3 is ejected from Fig. 2 during flight through the atmosphere, lanyard 131 removes keeper 136 from shaft 114, thus permitting shaft 114 to move into switch block 133 due to pressure exerted by compression spring 115 which is securely held between switch body 133 and support 116. Support 116 is securely attached to shaft 114. Electrical insulator stud 120 securely attaches electrical contact sleeve 118 and electrical insulator collar 117 to shaft 114. Shaft 114 moves into switch block 133 until flexible washer 138, secured in position by means of support plate 139 and nut 140, both of which are securely attached to shaft 114, is held in a liquid pressure tight manner against the exterior surface of switch block 133. Electrical contact sleeve 118 then forms an electrical contact and closes the circuit between spring contacts 119 and 129. Spring contact support 125 is securely attached to switch block 133 in a liquid pressure tight manner. Spring contacts 119 and 129 are securely attached to spring contact support 125 by means of rivet 121. Electrical insulating washers 122, 123, 127 and 128 insulate spring contacts 119 and 129 from spring contact support 125 and rivet 121. Rivet 121 is electrically insulated from spring contact support 125 by means not shown. Spring contacts 119 and 129 are connected into the circuit to be closed by lead wires 124 and 125 which are securely electrically attached to spring contacts 119 and 129 and are secured in spring contact support 125 in a liquid pressure tight manner. Holes 130 and 132 are for the purpose of securing switch block 133 in position between ring 28 and bulkhead 29 by means not shown.

Ring 33 is securely attached to cap 31 which is securely attached to cartridge adapter 41. Cap 31 and cartridge adapter 41 retain cartridge support plate 32 in a secure and pressure-tight manner. Gasket 34 serves as a water and gas pressure seal. Cartridge support plate 32 securely retains electrical insulator 35 within which cartridge electrode 39 is securely attached. Cartridge electrode 39 makes electrical contact with cartridge 40 with one of its ends while attached to its other end is insulated electrical conductor 36. Cartridge adapter 41 is securely attached to support tube 63 in a water and gas pressure-tight manner and securely retains gasket 47, gasket 46, gasket 45, orifice plate 44, and antenna lock-release body 52 in fixed positions. Orifice port 42 within orifice plate 44 is adjustable for the purpose of bleeding gas pressure as required. The telescopic antenna is secured in a collapsed position by means of flexible cable 58 which is attached to piston 53 and securely attached to the smallest section of the antenna, antenna section 72. Collar 57 prevents damage to flexible cable 58. The length of flexible cable 58, shown as 59, and external to piston 53, is of larger diameter than the remainder of flexible cable 58. The battery for the radio, both not shown since they may be of a variety of forms, is retained between bulkhead 29 and support disc 76 by means of coupling 78. Opening 77 in support disc 76 allows wires to pass from battery to radio. One support plate of the radio chassis, not shown, is secured between support disc 76 and coupling 78. Support tube 63 is securely connected in a gas pressure-tight manner to support tube 79 by means of coupling 78. Tube 63 is of larger inside diameter than tube 79 so that antenna locking spring 62 is free to expand and is not obstructed in any manner when the antenna is being erected to its outstretched length. Coupling 80 is connected in a gas pressure-tight manner to tube 79 and is constructed of a radio frequency insulating material. Attached in a secure and gas pressure-tight manner to coupling 80 is a radio switch composed of elements 89, 87, 83, 85, 90, 91, 92, 158, 86, 88, 93, 94, 95 and 84, which will be described later. Orifice 82 within coupling 80 is for the purpose of bleeding the proper gas pressure to the radio switch to cause it to operate in a satisfactory manner.

Metallic coupling 156 is securely attached to insulating coupling 80 in a gas pressure-tight manner and performs the following functions: to conduct radio frequency current into the antenna locking spring 62 shown dotted in its position after antenna erection; and to form a circular restricting cavity above shoulder 81 of coupling 80 of larger diameter than inside diameter of coupling 80 and having shoulder 155 of smaller diameter than outside diameter of antenna piston 60, so that when antenna piston 60 is moving at high velocity due to gas pressure exerted on its face it will be prevented from moving further than shoulder 155 by interference of piston 60 with shoulder 155, and at the same time, antenna locking spring 62 expands within the restricting cavity, thus permanently preventing antenna piston 60 from moving due to vibration, without the space bounded by shoulders 81 and 155. Connection of radio frequency current to coupling 156 is not shown since it may be accomplished by ordinary means.

Tube 96 is securely attached to coupling 156 in a gas pressure-tight manner and provides a guide tube for the antenna during erection and a support after erection. Lock collar 97 is adjustable on tube 96 for the purpose of reinforcing insulating collar 98. Insulating collar 99 insulates tube 96 from bulkhead 111 and is retained in position by adjustable collar 102 which is attached to tube 96. Gaskets 100 and 101 are securely held in position and are water pressure-tight. Sealing diaphragm 104 is securely held in position against tube 96 by adjustable collar 103 which is securely attached to adjustable collar 102. Diaphragm 104 is secured in a water pressure-tight manner and is of such mechanical strength that it will withstand the plunging of the invention into water at high velocity without breaking or leaking and yet can be punctured by antenna sections 68, 67, 66, 65 and 64 when gas pressure is applied to erect the antenna. The sealing diaphragm 104 causes a water-tight seal to be made around antenna piston 69 and tube 96 upon complete erection of the antenna, thus preventing water leakage into tube 96 that may be caused by waves breaking over the top of the device.

Bulkhead 29 is securely attached in a water pressure-tight manner to tube 63 by means not shown. Shield can or outer housing 112 is securely held in position in a water pressure-tight manner between bulkheads 29 and 111. Bulkhead 111 is securely held in position by adjustable collar 102 which is adjustably attached to tube 96, thereby holding insulator 99 in position so that bulkhead 111 is retained securely between insulator 99 and insulator 98 with insulator 98 being secured in position by adjustable collar 97 which is adjustably attached to tube 96.

Support ring 28 is securely attached to bulkhead 29. Battery 74 is secured in battery cup 30 and made water pressure-tight by sealing compounds 73 and 75. Several battery cups are shown which are securely attached to support ring 28. Mercury switch cap 26 is securely attached to support ring 28 by screw 27. Safety switch -2 is securely held in position between support ring 28 and bulkhead 29 by means not shown. Batteries 74 are connected with mercury switch lead wires 1 and 6, safety switch lead wires 124 and 126 and cartridge lead wire 36 and cartridge adapter 41 to form a firing circuit for cartridge 40. Cartridge adapter 41 is at ground potential.

The tubular telescopic antenna may be composed of any number of telescopic tubes. The antenna of this invention is composed of telescopic tubes 68, 67, 66, 65 and 64, each of which has securely attached to one end its respective piston, namely pistons 72, 71, 70, 69 and 60. The ends of telescopic antenna sections, opposite to the ends, to which the pistons are securely attached, are formed to a smaller diameter for a short longitudinal length as shown on collapsed antenna telescopic tubes 67, 66, 65 and 64. Telescopic tube 68 is the innermost tube and is of uniform diameter. Pistons 72, 71, 70 and 69 have a taper on the outside diameter for the purpose of providing a gas pressure seal against the inner surface of telescopic antenna tubes 67, 66, 65 and 64 respectively, and also for the purpose of mating with the smaller inside diameters of the ends 67, 66, 65 and 64 so that the antenna is securely electrically and mechanically locked after gas pressure is applied. Pistons 60, 69, 70 and 71 pass expanding gas from one to the other and finally to piston 72 by means of a concentric hole or port continuing their full length, except piston 72, which has no hole. The holes or ports in the several pistons serve the added function of permitting flexible cable 58 which is securely attached to piston 72 to pass through until it is finally attached to release piston 53. The function of flexible cable 58 is to cause the telescopic antenna to remain in a collapsed position during handling and free flight of the device and until gas pressure is created by firing of cartridge 40. Piston 60 is of different construction than the other pistons having uniform outside diameter with a circular groove 154 which retains a spring 62 in such a manner that, when the antenna is in its erected position as shown by dotted lines, spring 62 engages both piston 60 and shoulder 81 of insulated coupling 80 to prevent movement of piston from without the cavity in coupling 156, said cavity bounded by shoulders 81 and 155. Spring 62 is always in contact with the metallic surface of metallic coupling 156 and conducts radio frequency current from coupling 156 to piston 60 which conducts current to telescopic tubes 64, etc. to the complete antenna. Flexible cable 58 passes through all pistons and telescopic antenna tubes upon antenna erection except tube 68 and remains securely attached by one end to piston 72.

Cartridge 40 is fired by the firing circuit after the apparatus has alighted upon the water, inverted its position, and the expiration of a time delay caused by a time delay position operated switch to be later described.

The following gives a more detailed description of the time delay position operated switch.

Referring to Fig. 2, the mercury switch, which may also utilize other suitable electrolytes, is composed of a housing formed by cap 26, body 14 and cap 9. Cap 26, body 14 and cap 9 are constructed of a material which will not cause amalgamation with mercury and which is an electrical non-conductor. Cap 26 is securely attached to support ring 28. Body 14 is securely attached in a water pressure-tight manner to cap 26 with gasket 25 as a mercury and water seal. Cap 9 is securely attached to body 14 in a water pressure-tight manner with gasket 10 serving as a mercury and water seal.

Cavities 24, 23, 22, 21 and 20 contain mercury which is retained in these cavities by flexible washer 19 being retained tightly against shoulder 159. Flexible washer 19 is securely retained between supports 17 and 18. Support 17 is securely attached to shaft 5, thus securing support 18 to shaft 5. Flexible washer 16 is secured to shaft 5 by means of support 18. Shaft 5 passes freely through a centrally located hole in cap 9. Cap 3 is securely attached to shaft 5 and retains spring 4 between itself and cap 9. Spring 2 freely fits around a shoulder of cap 3 and overpowers spring 4 when compressed sufficiently. It is thus seen that, when spring 2 is compressed sufficiently by Fig. 3 being properly attached to bulkhead 29 of Fig. 2, the flexible washer 19 seals cavity 15 from cavities 24, 23, 22 and 21, thereby preventing mercury from leaving cavities 24, 23, 22 and 21 and entering cavity 15, irrespective of the position of the invention. Spring 2 also serves as a means of adjustment for variation in dimensions of manufactured parts.

Electrical contact 13 is securely attached to cap 9 and is electrically connected to electric conducting lead wire 6. Electric insulating washer 12 is securely attached to cap 9. Electrical contact 11 is securely attached to cap 9 and is electrically connected to electric conducting lead wire 1. Lead wires 1 and 6 are coated with a waterproof material and are made watertight at their entrance and passage through cap 9 by means of counterbore 7 being filled with a durable plastic waterproof compound.

When Fig. 3 is ejected from bulkhead 29 of Fig. 2, spring 2 is released which allows spring 4 to extend and move flexible washer 19 away from shoulder 159. Shaft 5 carrying flexible washer 16 moves to its other extreme position and causes flexible washer 16 to be forced against shoulder 43 of cap 9 in a water pressure-tight manner. By virtue of the Fig. 2 dropping to a surface of the earth on a parachute attached to ring 33, mercury is restrained by gravity from entering cavity 15.

Upon inversion of Fig. 2 so that cavities 24, 23, 22 and 21 are at a higher elevation than cavity 15, mercury is caused by gravity to enter cavity 15. The distance between the inside surface of cap 26 and the closest end of the material surrounding cavity 23 is such that the mercury in cavity 23 will readily flow into cavity 15, thereby clearing cavity 23 so that it then becomes an air relief for cavity 15 by passing air from cavity 15 into cavity 24 as said air is displaced by mercury flowing through port 21. By virtue of cavity 23, the air pressures within cavities 24 and 15 are equalized and prevent formation of an air lock. Various relationships between the sizes of cavities 23, 24, 22, port 21 and cavity 15 may be determined which will cause various time delays. Cavity 22 reduces the length of port 21 for the purpose of reducing friction loss when mercury is passing through port 21 and thereby permitting the wall between cavities 24 and 15 to be of a size sufficient to withstand all shock loading incident to the proper operation of the invention of Fig. 1.

The volume of cavity 15 in conjunction with volumes of cavities 24, 23, 22 and the volume of the annular space adjacent to electrical contact rings 13 and 11 and inside diameter of body 14, is determined in such a manner that positive electrical contact between rings 13 and 11 results for a sufficient given volume of mercury within cavity 15. This particular arrangement insures positive operation of the mercury switch when cavity 24 is at higher elevation than cavity 15 irrespective of position with respect to a vertical axis.

The following gives a more detailed description of the antenna lock and release cylinder.

Referring to Fig. 1, the telescoping antenna represented by telescopic tubes 68, 67, 66, 65 and 64 is held in a restrained collapsed position by flexible cable 58 which is securely attached to piston 72 (which is in turn securely attached to telescopic tube 68) and removably attached to piston 53 of the device. Flexible cable 58 is of uniform diameter except that the portion shown as 59 is of larger diameter so that it is restrained by a slot cut in the rod end of piston 53 of the device.

When cartridge 40 is ignited, gas is permitted to bleed through orifice 42 of orifice plate 44 and thence through port 48 of the device to the face of piston 53 which heretofore has been restrained in the position shown by lock pin 51 which is spring loaded by spring 50, all held in position by adjustable screw 49. Gas pressure is exerted upon piston 53 and causes it to move in a direction which completely disengages flexible cable 58 before piston 53 uncovers any portion of port 56 of the device. When port 56 is uncovered by piston 53 the gas passes through port 56 and expands against antenna pistons 60, 69, 70, 71 and 72, thus causing erection of the antenna. Port 54 is a relief port to relieve any back pressure. Body 52 carries all the parts necessary to the device and transmits all inertia reaction weight of the antenna, upon deceleration due to parachute opening, to tube 63 thence through cartridge adapter 41 to cap 31 and finally to ring 33. Plug screw 55 is required for assembly purposes. Piston 53 is restrained from any chattering action during gas expansion by locking pin 51 engaging the stepped portion of piston 53.

The following gives a more detailed description of the pressure operated electric switch.

Referring to Fig. 1, switch body 88 is securely attached in a gas pressure-tight manner to insulated coupling 80. When plug 60 of the telescopic antenna is approaching its erected position shown in dotted lines, it allows gas pressure to bleed through port 82 of insulated coupling 80. Gas pressure then is applied through port 89 to piston 86 thus causing piston 86 to move in such a position that its smallest diameter end exerts sufficient pressure against electrical spring contacts 93, 94 and 95 to cause electrical connection to be made between spring contacts 93, 94 and 95. Many other arrangements of spring contacts will be apparent. Insulating spacers 90, 91 and 92 electrically insulate spring contacts 93, 94 and 95 from each other and switch body 88 prior to closing of the spring contacts 93, 94 and 95. No connection of switch contacts 93, 94 and 95 to an external circuit has been shown since this may be of various forms. Locking pin 85 locks piston 86 in position both before and after application of the operating gas pressure. When piston 86 has been acted upon by gas pressure, locking pin 85 is caused to recede against spring 84 by force transmitted to it from the tapered surface of piston 86. Spring 84 causes locking pin 85 to move beyond the large diameter end of piston 86 after the large diameter end of piston 85 has been moved by gas pressure to such a position that the spring contacts 93, 94 and 95 are closed. Piston shoulder 158 prevents overtravel of piston 86 and thus protects the spring contacts from being distorted. Screw 83 retains spring 84 in position. Cap 87 permits assembly of piston 86 and retains piston 86 in position during vibration and shock loading when the parachute opens and when the device of Fig. 2 strikes the surface of the earth so that no load is imposed upon lock pin 85.

The invention described herein may be manufactured and used by or for the Government of the United States of America for governmental purposes without the payment of any royalties thereon or therefor.

What is claimed is:

1. In a radio drift bomb to be dropped from an aircraft for the purpose of obtaining the drift angle of said aircraft, comprising: a first casing; a radio transmitting apparatus and a source of power therefor housed in said first casing; a second casing having air vane means thereon and a parachute housed therein for controlling the rate of descent of said first casing; means for detachably securing said second casing to said first casing; means for disengaging said second casing from said first casing after the said drift bomb has fallen a predetermined distance, so that said second casing may fall freely of said first casing thereby releasing said parachute; a counterweight for orienting the drift bomb for desirable parachute opening; and means for detachably securing said counterweight to said first casing and operative for releasing said counterweight by inertia reaction resulting from the opening of said parachute, said counterweight being disposed of and of a mass operative to change the center of gravity and center of buoyancy of said drift bomb, whereby said bomb, upon alighting on a water surface, assumes a position generally inverted with respect to that which it had while falling freely through atmosphere.

2. The apparatus defined in claim 1 characterized further by the addition thereto of a source of fluid pressure mounted on said first casing; a telescopic antenna mounted on said first casing, adapted to be erected directly by said fluid pressure; and means for conducting radio signals from said transmitter to said antenna.

3. The apparatus defined in claim 1 characterized further by the addition thereto of electrically controlled gas pressure providing means mounted on said first casing; a telescopic antenna mounted on said first casing, adapted to be erected by said gas pressure source; means for conducting radio signals from said transmitter to said antenna; and position-operated switch means mounted on said first casing for controlling the initiation of operation of said gas pressure providing means adapted to effect a closed circuit when the first casing assumes an inverted position in water, said electrically controlled gas pressure providing means and said position operated switch means being connected in series across said power supply.

4. The apparatus defined in claim 1 characterized further by the addition thereto of electrically controlled gas pressure providing means mounted on said first casing; a telescopic antenna mounted on said first casing, adapted to be erected by said gas pressure source; means for conducting radio signals from said transmitter to said antenna; a gas pressure operated electric switch mounted on said first casing, adapted to be operated by said gas pressure source, for initiating the operation of said transmitter; and position operated electrolytic switch means mounted on said first casing for controlling the initiation of operation of said gas pressure providing means, adapted to be inoperative when said first and second casings are in engagement, operative when said second casing is moved out of engagement with said first casing, and adapted to effect a closed circuit when the first casing assumes an inverted position in water, said electrically controlled gas pressure providing means and said position operated switch means being connected in series across said power supply.

5. The apparatus defined in claim 1 characterized further by the addition thereto of electrically controlled gas pressure providing means mounted on said first casing; a telescopic antenna mounted on said first casing, adapted to be erected by said gas pressure source; means for conducting radio signals from said transmitter to said antenna; safety switch means mounted in said first casing adapted to be positioned into conductive engagement for armed operation when said second casing is caused out of engagement with said first casing; and position operated electrolytic switch means mounted on said first casing for controlling the initiation of operation of said gas pressure providing means, adapted to be inoperative when said first and second casings are in engagement, operative when said second casing is moved out of engagement with said first casing, and adapted to effect a closed circuit when the first casing assumes an inverted position in water, said electrically controlled gas pressure providing means, said position operated switch means, and said safety switch means being connected in series across said power supply.

6. The apparatus defined in claim 1 characterized further by the addition thereto of electrically controlled gas pressure providing means mounted on said first casing; a telescopic antenna mounted on said first casing, adapted to be erected by said gas pressure source; means for conducting radio signals from said transmitter to said antenna; means mounted in said first casing normally holding said antenna in a collapsed position and adapted to be released by said gas pressure source; a gas pressure operated electric switch mounted on said first casing, adapted to be operated by said gas pressure source, for initiating the operation of said transmitter; safety switch means mounted on said first casing adapted to be positioned into conductive engagement for armed operation when said second casing is moved out of engagement with said first casing; and position operated electrolytic switch means mounted on said first casing for controlling the initiation of operation of said gas pressure providing means, adapted to be inoperative when said first and second casings are in engagement, operative when said second casing is moved out of engagement with said first casing, and adapted to effect a closed circuit when the first casing assumes an inverted position in water, said electrically controlled gas pressure providing means, said safety switch means, and said position operated switch means, being connected in series across said power source.

7. The apparatus defined in claim 1 characterized further by the addition thereto of an electrically controlled gas pressure producing cartridge mounted on said first casing; a telescopic antenna mounted on said first casing, adapted to be erected by said gas pressure source; means for conducting radio signals from said transmitter to said antenna; means mounted on said first casing normally holding said antenna in a collapsed position and adapted to be released by said gas pressure source; a gas pressure operated electric switch mounted in said first casing, adapted to be operated by said gas pressure source, for initiating the operation of said transmitter; safety switch means mounted in said first casing adapted to be positioned into conductive engagement for armed operation when said second casing is forced out of engagement with said first casing; time delay position operated electrolytic switch means mounted on said first casing for controlling the initiation of operation of said gas pressure providing means, adapted to be inoperative when said first and second casings are in engagement, operative when said second casing is forced out of engagement with said first casing, and adapted to effect a closed circuit when the first casing assumes an inverted position in water; a second source of electrical power mounted on said first casing connected in series with said electrically controlled gas pressure producing cartridge, said safety switch means, and said time delay position operated electrolytic switch means; and a frangible cover secured watertight over the outlet opening of said tube which can be broken by the antenna as it is forced into erection through the tube outlet.

8. In a radio drift bomb adapted to be dropped from an aircraft for the purpose of obtaining the drift angle of said aircraft, comprising: a first casing having a tube carried thereby containing a telescopic antenna adapted to be erected by gas pressure; a radio transmitting apparatus and a source of power therefor housed in said first casing, said transmitter being electrically connected to said antenna; a second casing having air vane means thereon and a parachute housed therein for controlling the rate of descent of said first casing, said second casing being detachably secured to said first casing; means for forcing said second casing out of securing engagement with said first casing after the said drift bomb has fallen a predetermined distance, so that said second casing may fall freely of said first casing thereby releasing said parachute; a counterweight for orienting the drift bomb for desirable parachute opening; and means for detachably securing said counterweight to said first casing and operative for releasing said counterweight by inertia reaction resulting from the opening of said parachute, said counterweight being disposed and of a mass operative to change the center of gravity and center of buoyancy of said drift bomb, whereby said bomb, upon alighting on a water surface, assumes a position generally inverted with respect to that which it had while falling freely through the atmosphere.

9. In a radio drift bomb adapted to be dropped from an aircraft for the purpose of obtaining the drift angle of said aircraft, comprising: a first casing having a tube mounted longitudinally therein containing a telescopic antenna adapted to be erected by gas pressure; a radio transmitting apparatus and a first source of power therefor housed in said first casing, said transmitter being electrically connected to said antenna; a second casing having air vane means thereon and a parachute housed therein for controlling the rate of descent of said first casing, said second casing being detachably secured to said first casing; means for disengaging said second casing from said first casing after the said drift bomb has fallen a predetermined distance, so that said second casing may fall freely of said first casing thereby releasing said parachute; a counterweight for orienting the drift bomb for desirable parachute opening; means for detachably securing said counterweight to said first casing and operative for releasing said counterweight by inertia reaction resulting from the opening of said parachute, said counterweight being disposed and of a mass operative to change the center of gravity and center of buoyancy of said drift bomb, whereby said bomb, upon alighting on a water surface, assumes a position generally inverted with respect to that which it had while falling freely through the atmosphere; and a frangible cover secured watertight over the outlet opening of said tube which can be broken by the antenna as it is forced into erection through the tube outlet.

10. The apparatus defined in claim 9 characterized further by the addition thereto of a source of gas pressure mounted on said first casing for erecting said antenna.

11. The apparatus defined in claim 9 characterized further by the addition thereto of electrically controlled gas pressure providing means mounted on said first casing for erecting said antenna; and position operated switch means mounted on said first casing for controlling the initiation of operation of said gas pressure providing means adapted to effect a closed circuit when the first casing assumes an inverted position in water, said electrically controlled gas pressure providing means, and said position operated switch means being connected in series across said power source.

12. The apparatus defined in claim 9 characterized further by the addition thereto of electrically controlled gas pressure providing means mounted on said first casing for erecting said antenna; a gas pressure operated electric switch mounted on said first casing, adapted to be operated by said gas pressure source, for initiating the operation of said transmitter; and position operated electrolytic switch means mounted on said first casing for controlling the initiation of operation of said gas pressure providing means, adapted to be inoperative when said first and second casings are in engagement, operative when said second casing is moved out of engagement with said first casing, and adapted to effect a closed circuit when the first casing assumes an inverted position in water, said electrically controlled gas pressure providing means, and said position operated switch means being connected in series across said power source.

13. The apparatus defined in claim 9 characterized further by the addition thereto of electrically controlled gas pressure providing means mounted on said first casing for erecting said antenna; safety switch means mounted on said first casing adapted to be positioned into conductive engagement for armed operation when said second casing is caused out of engagement with said first casing; and position operated electrolytic switch means mounted on said first casing for controlling the initiation of operation of said gas pressure providing means, adapted to be inoperative when said first and second casings are in engagement, operative when said second casing is moved out of engagement with said first casing, and adapted to effect a closed circuit when the first casing assumes an inverted position in water, said electrically controlled gas pressure providing means, said safety switch means, and said position operated switch means being connected in series across said power source.

14. The apparatus defined in claim 9 characterized further by the addition thereto of electrically controlled gas pressure providing means mounted on said first casing for erecting said antenna; a gas pressure operated electric switch mounted on said first casing, adapted to be operated by said gas pressure source, for initiating the operation of said transmitter; safety switch means mounted on said first casing adapted to be positioned into conductive engagement for armed operation when said second casing is moved out of engagement with said first casing; and position operated electrolytic switch means mounted on said first casing for controlling the initiation of operation of said gas pressure providing means, adapted to be inoperative when said first and second casings are in engagement, operative when said second casing is moved out of engagement with said first casing, and adapted to effect a closed circuit when the first casing assumes an inverted position in water, said electrically controlled gas pressure providing means, said safety switch means, and said position operated switch means being connected in series across said power source.

15. The apparatus defined in claim 9 characterized further by the addition thereto of an electrically controlled gas pressure producing cartridge mounted on said first casing for erecting said antenna; means mounted on said first casing normally holding said antenna in a collapsed position and adapted to be released by said gas pressure source; a gas pressure operated electric switch mounted on said first casing, adapted to be operated by said gas pressure source, for initiating the operation of said transmitter; safety switch means mounted on said first casing adapted to be positioned into conductive engagement for armed operation when said second casing is moved out of engagement with said first casing; time delay position operated electrolytic switch means mounted on said first casing for controlling the initiation of operation of said gas pressure providing means, adapted to be inoperative when said first and second casings are in engagement, operative when said second casing is moved out of engagement with said first casing, and adapted to effect a closed circuit when the first casing assumes an inverted position in water; a second source of electrical power mounted on said first casing connected in series wtih said electrically controlled gas pressure producing cartridge, said safety switch means, and said time delay position operated electrolytic switch means.

RAYMOND L. FREAS.

REFERENCES CITED

The following references are of record in the file of this patent:

UNITED STATES PATENTS

| Number | Name | Date |
|---|---|---|
| 1,557,389 | Todd | Oct. 13, 1925 |
| 1,705,474 | Hammond | Mar. 18, 1929 |
| 1,780,369 | Snow | Nov. 4, 1930 |
| 2,027,367 | Blair | Jan. 14, 1936 |
| 2,074,683 | Driggs | Mar. 23, 1937 |
| 2,085,585 | Hamilton | June 29, 1937 |
| 2,124,876 | Driggs | July 26, 1938 |
| 2,198,697 | Driggs | Apr. 30, 1940 |
| Re. 21,764 | Irvin | Apr. 8, 1941 |
| 2,281,284 | Hammond | Apr. 28, 1942 |
| 2,323,064 | Lustfield | June 29, 1943 |
| 2,329,329 | Brach | Sept. 14, 1943 |
| 2,392,199 | Steiger | Jan. 1, 1946 |